Aug. 11, 1925.
C. F. SMITH
1,548,855
RESERVE SUPPLY VALVE FOR TANKS
Filed April 23, 1923
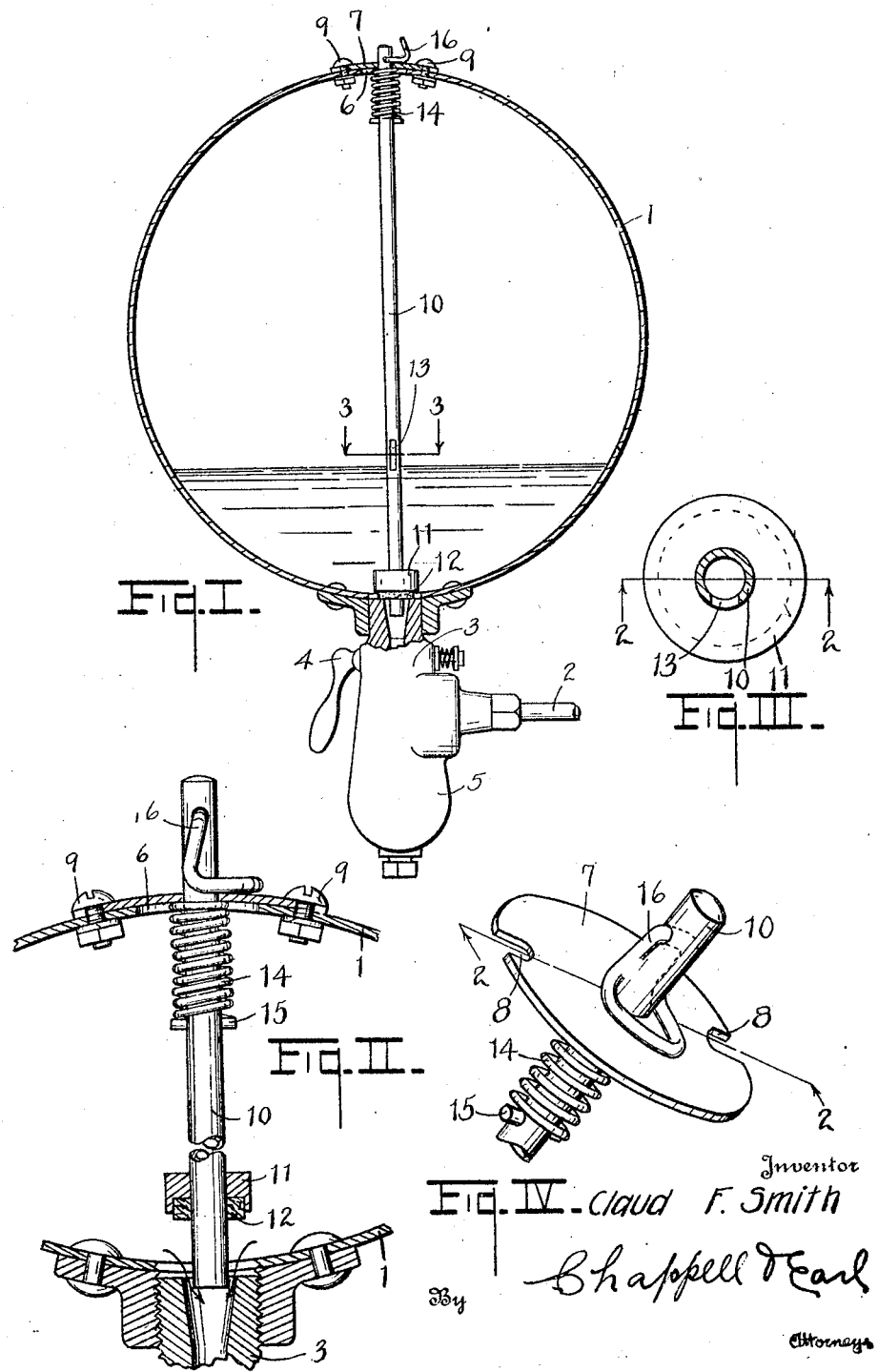
Fig.I.
Fig.II.
Fig.III.
Fig.IV.
Inventor
Claud F. Smith
By Chappell & Earl
Attorneys Patented Aug. 11, 1925.

1,548,855

UNITED STATES PATENT OFFICE.

CLAUD F. SMITH, OF KALAMAZOO, MICHIGAN.

RESERVE-SUPPLY VALVE FOR TANKS.

Application filed April 23, 1923. Serial No. 633,859.

*To all whom it may concern:*

Be it known that I, CLAUD F. SMITH, a citizen of the United States, residing at the city and county of Kalamazoo, State of Michigan, have invented certain new and useful Improvements in Reserve-Supply Valves for Tanks, of which the following is a specification.

This invention relates to improvements in reserve supply valves for tanks.

My improved reserve supply valve is especially designed by me for use in fuel tanks of motor vehicles and I have illustrated the same as adapted for use in such fuel tanks, although my improvements are of general application where it is desired to provide for a reserve supply.

The main objects of this invention are:

First, to provide an improved reserve supply valve structure for tanks which is adapted to be applied as an attachment to fuel tanks now in extensive use.

Second, to provide an improved reserve valve structure which is simple and economical in its parts and easily operated, at the same time one which is secure and effective for the purpose.

Further objects, and objects relating to structural details, will definitely appear from the detailed description to follow.

I accomplish the objects of my invention by the devices and means described in the following specification. The invention is clearly defined and pointed out in the claim.

A structure which is a preferred embodiment of my invention is clearly illustrated in the accompanying drawing, forming a part of this application, in which:

Fig. I is a vertical section through a tank, the parts of my improved valve mechanism other than the closure for the opening in the tank formed to admit the valve, being in full lines.

Fig. II is an enlarged detail section partially in section on a line corresponding to line 2—2 of Figs. III and IV, with the valve in open position.

Fig. III is a horizontal section on a line corresponding to line 3—3 of Fig. I.

Fig. IV is a detail perspective view of the upper end of the valve stem and the closure plate.

In the drawing similar reference characters refer to similar parts throughout the several views, and the sectional views are taken looking in the direction of the little arrows at the ends of the section lines.

Referring to the drawing, 1 represents the fuel tank of a motor vehicle, 2 the feed pipe leading therefrom and 3 the discharge connection having the cut-off valve 4 and sediment well 5. These parts are of well known type.

In the installation of my improved reserve valve, I provide a hole 6 in the top of the tank in alignment with its discharge. If the tanks are especially manufactured for my improvements this hole would be formed as the tank is manufactured when my improvements are installed. In tanks now in use the hole is punched or cut by means of a suitable tool, the closure plate 7 being provided to close this opening, the plate being notched at 8 to receive the bolts 9 at the sides of the opening 6.

The tubular stem 10 is of such length as to project into the discharge connection 3 and to project from the closure plate 7.

The valve 11 is mounted on the stem in spaced relation to the lower end thereof so that the valve seats upon the inner end of the connection 3 as shown in Fig. I, the valve having a suitable resilient facing 12.

A discharge opening 13 is formed in the valve stem in spaced relation to the valve so that the fuel or liquid above the plane of this opening is discharged through the valve stem.

The spring 14 is disposed on the valve stem on the underside of the closure 7 to engage the pin 15 on the stem, urging the valve against its seat.

To hold the valve open, I provide an angled bail or loop-like support 16 pivoted on the stem above the closure and adapted to be swung into engagement therewith, as shown in Fig. IV, thereby supporting the valve in open position against the pressure of its spring and thereby allowing the reserve supply to escape from the tank.

With the parts thus arranged, the driver of the vehicle is warned when the fuel reaches the bottom of the discharge opening in the stem that he has only the reserve supply of fuel remaining in the tank.

My improvements may be embodied in the tanks as manufactured or readily applied or added to fuel tanks now in extensive use.

Having thus described my invention, what

I claim as new and desire to secure by Letters Patent is:

The combination of a tank provided with a discharge connection at the bottom thereof, said tank having an opening at the top thereof opposite said discharge connection, a closure for said opening provided with means for attachment to the tank, a tubular valve stem reciprocating in said closure and projecting into said discharge connection, a valve mounted on said stem in a spaced relation to its lower end and adapted to seat on said discharge connection, said valve stem having a discharge opening in a spaced relation to said valve thereby permitting the escape of the liquid above the plane of said opening while said valve is closed, a coiled spring disposed on said stem in engagement with said closure, said stem being provided with a thrust member for said spring whereby the valve is urged to its seat, and an angular loop-like valve support pivotally mounted on the upper end of said valve stem to be swung into engagement with said closure member for supporting said valve in open position.

In witness whereof, I have hereunto set my hand.

CLAUD F. SMITH. [L. S.]